(No Model.)
J. G. HODGSON.
NUT AND BOLT LOCK.
No. 540,387. Patented June 4, 1895.
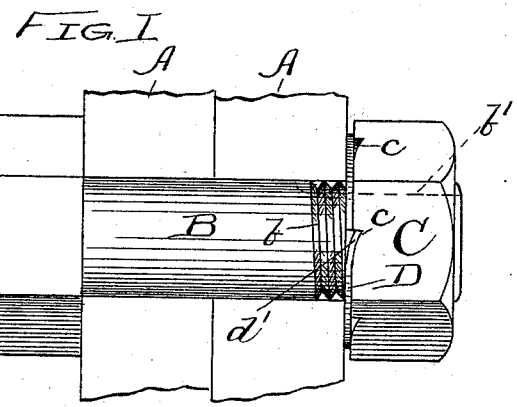
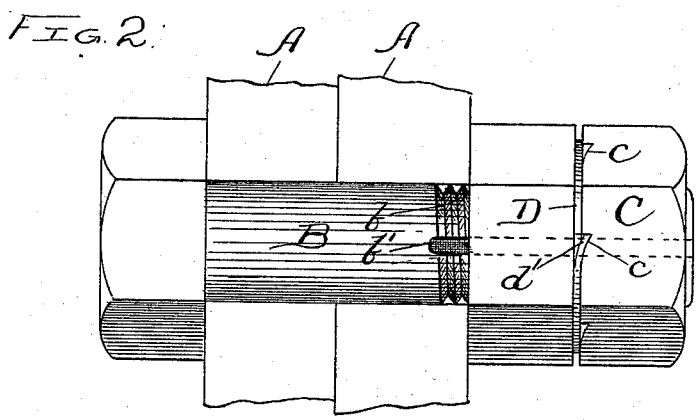
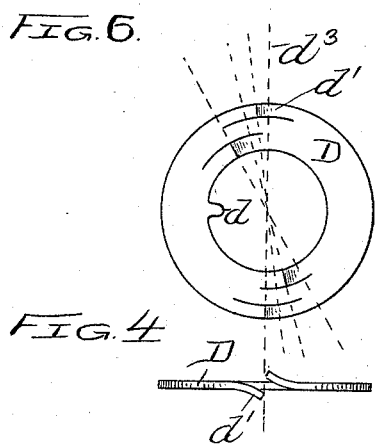
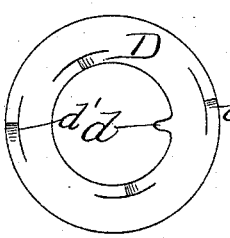
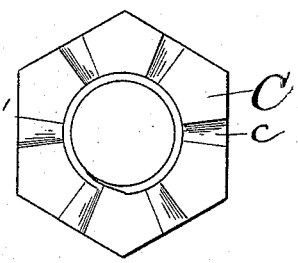
WITNESSES:
INVENTOR:
JOHN G. HODGSON
BY Munday, Evarts & Adcock.
HIS ATTORNEYS.

UNITED STATES PATENT OFFICE.

JOHN G. HODGSON, OF MAYWOOD, ILLINOIS.

NUT AND BOLT LOCK.

SPECIFICATION forming part of Letters Patent No. 540,387, dated June 4, 1895.

Application filed April 7, 1894. Serial No. 506,671. (No model.)

*To all whom it may concern:*

Be it known that I, JOHN G. HODGSON, a citizen of the United States, residing in Maywood, in the county of Cook and State of Illinois, have invented a new and useful Improvement in Nut and Bolt Locks, of which the following is a specification.

My invention relates to nut locks or devices for preventing nuts and bolts from turning in respect to each other.

My invention consists in connection with a bolt having a longitudinal groove on its periphery and a nut furnished with a series of notches on its face, of a washer furnished with an internal projection adapted to fit in the longitudinal groove in the bolt and provided with a number of free spring teeth integral with the washer on the inner or outer margin thereof, the spring teeth being located differentially in respect to each other on the washer, so that if, for example, there are six notches on the nut and four of these differentially located free spring teeth on the washer, the nut can be locked in forty-eight different positions at each turn or revolution thereof, thus enabling the nut to be screwed or tightened up one forty-eighth of a turn and again locked, although the washer contains only four spring teeth. This enables the washer to be practically and cheaply manufactured, the teeth to be made of sufficient size and length to act efficiently as springs and to properly engage the notches in the nut, and also to be made of sufficient strength to singly hold or lock the nut and washer firmly and securely together. As the teeth are marginal teeth on the inner or outer margin of the washer, they, when stamped or cut therefrom, will be free to shut or move in or out of the plane of the washer, and thus act efficiently as spring teeth when formed integral with the washer, so that whenever one of the teeth is brought into registry with the notch in the nut it will spring into such notch and lock the nut from turning; while the remaining spring teeth, by the pressure of the nut against the washer, will be pressed into the plane of the washer and thus enable the nut and washer to fit flat together without any intervening space to subsequently form a slack in the nut. Where projections or teeth have heretofore been formed integral with the washer in the middle portion of the washer so that the teeth are surrounded on all sides by the walls of the hole or notch out of which the tooth is stamped, the tight frictional fit between the edges of the tooth and the walls of this hole or notch causes the tooth to bind and prevents its acting with any certainty as a spring tooth even where the washer is formed of spring metal such as sheet steel; but by employing free marginal integral teeth on the washer, the teeth are given room to act with perfect freedom under their natural resiliency, and I am thus enabled to produce at small cost an efficient nut lock device that can always be relied upon to act with certainty.

In the accompanying drawings, which form a part of this specification, and in which similar letters of reference indicate like parts, Figure 1 is a side elevation, partly in section, of a device embodying my invention. Fig. 2 is a similar view, the bolt being in a different position to show the longitudinal groove on its surface or periphery. Fig. 3 is a face view of the washer. Fig. 4 is an edge view of the washer. Fig. 5 is a face view of the nut, and Fig. 6 is a face view of the washer, showing the differential spring-teeth located contiguous to each other with dotted lines drawn to more clearly illustrate their relative arrangement or location.

In the drawings A A represent pieces of wood or iron through which the bolt B extends. The bolt B has screw threads $b$ and longitudinal slot or groove $b'$ on its surface.

C is the nut furnished with a series of notches or depressions $c$ in its face, regularly located in respect to each other, and preferably six in number so that they are one-sixth of a circumference apart.

D is the washer it being preferably of sheet steel or other spring metal; and furnished with an internal projection $d$ adapted to fit and slide in the longitudinal groove $b'$ in the bolt.

The washer D is also provided with a number, preferably four, marginal spring teeth $d'$ integral with the washer and formed preferably by cutting or stamping the same up by suitable dies and differentially located in respect to each other around the circumference of the washer, so that when any one of the teeth is in engagement with a notch $c$ in the nut C, the others will be at intermediate aliquot positions between the notches, so that at each forty-eighth of a turn of the nut C, one of the spring teeth $d'$ will engage one of the notches $c$ in the nut C. This is clearly illustrated in the drawings especially in Fig. 6, where to show this more clearly, the marginal spring teeth are located in part contiguous to each other and in part in the diametrically opposite segment of the washer, and radial dotted lines $d^3$ drawn to indicate their relative arrangement and the radial space between them. In Fig. 3 the arrangement is the same excepting that the teeth are distributed more evenly about the circumference of the washer, so that the washer may be more easily and cheaply manufactured, and so that the cutting of the teeth will not materially injure or weaken the washer, and so that the washer may be made of a smaller or narrower ring.

The spring teeth $d'$, it will be observed, are located at either the inner or outer margin of the washer, so that there is no confining wall on one side of each tooth, thus leaving the spring tooth entirely free and unconfined on this side and permitting it to move freely in and out of the plane of the washer without binding against the surrounding wall of the washer formed by the cut. This also facilitates the cutting or stamping of the spring teeth out of the washer.

To enable the washer to be turned either face against the nut, I provide a double set of these spring teeth facing in opposite directions as is clearly indicated in the drawings. This also facilitates the manufacture as the two teeth are formed with their projecting ends meeting each other and separated by a single cut or slit. The nut may also have the series of notches on both faces, if desired.

I claim—

1. The combination with a bolt having a longitudinal groove on its surface or periphery, of a nut having a series of notches on its face, and a washer having an internal projection fitting in the longitudinal groove in the bolt, and provided with a number of free marginal spring teeth integral with the washer differentially located in respect to each other around the circumference of the washer, so that one of said teeth at a time will engage a notch in the nut, and the remaining teeth be at intermediate aliquot positions between the notches of the nut thus enabling a few spring teeth to lock the nut in a great number of different positions, substantially as specified.

2. The combination with a bolt having a longitudinal groove, of a nut having a series of notches on its face and a washer having an internal projection fitting in the longitudinal groove in the bolt, and provided with two series of free marginal spring teeth integral with the washer and projecting in opposite directions, the teeth of each series being differentially located in respect to each other around the circumference of the washer, the difference in the radial position of said teeth being an aliquot portion in respect to the number of teeth in each series of the space between consecutive notches in the nut, so that one of said teeth at a time will engage a notch in the nut, the projecting ends of the teeth of one series facing or meeting the like projecting ends of the teeth of the other series, and each pair of such facing or meeting teeth being separated by a single cut, substantially as specified.

3. The combination of bolt B having longitudinal groove $b'$ of a nut C having a series of notches $c$ in its face, and a washer D having a number of differentially located teeth $d'$, the difference in the radial position of said teeth being an aliquot portion in respect to the number of teeth of the space between consecutive notches in the nut so that one of said teeth at a time engages a notch in the face of said nut, substantially as specified.

JOHN G. HODGSON.

Witnesses:
H. M. MUNDAY,
EMMA HACK.